(12) United States Patent
Sieber et al.

(10) Patent No.: US 6,843,222 B2
(45) Date of Patent: Jan. 18, 2005

(54) METHOD AND DEVICE FOR STARTING AN INTERNAL COMBUSTION ENGINE HAVING DIRECT INJECTION

(75) Inventors: Udo Sieber, Bietigheim (DE); Jochen Laubender, Stuttgart (DE); Andre-Francisco Casal Kulzer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/734,534

(22) Filed: Dec. 12, 2003

(65) Prior Publication Data
US 2004/0177829 A1 Sep. 16, 2004

(30) Foreign Application Priority Data
Dec. 13, 2002 (DE) .......................................... 102 58 229

(51) Int. Cl.$^7$ ................................................. F02B 3/00
(52) U.S. Cl. ...................................... 123/299; 123/294
(58) Field of Search ................................. 123/299, 294, 123/491, 179.18, 179.16

(56) References Cited

U.S. PATENT DOCUMENTS

| | | | | |
|---|---|---|---|---|
| 6,112,716 A | * | 9/2000 | Tachibana | .................... 123/305 |
| 6,659,071 B2 | * | 12/2003 | LaPointe et al. | ............. 123/299 |
| 6,739,300 B2 | * | 5/2004 | Ackermann et al. | ...... 123/179.5 |

* cited by examiner

*Primary Examiner*—John T. Kwon
(74) *Attorney, Agent, or Firm*—Kenyon & Kenyon

(57) ABSTRACT

In a direct start of an internal combustion engine, sufficient energy may need to be released in a first combustion to set the internal combustion engine into motion, if possible without the assistance of an additional assembly, such as an electromotive starter. For this reason, the carburetion of an air-fuel mixture, made up of the air mass present in a combustion chamber and the fuel mass injected therein, is of great importance. In order to improve the mixture formation during a start, e.g., during a warm start of an internal combustion engine, the fuel mass required for a mixture formation is introduced into the combustion chamber, in full or in part, already prior to a start phase by at least one injection, and the mixture formation may be improved in this manner by vaporization of the introduced fuel mass.

19 Claims, 2 Drawing Sheets

METHOD AND DEVICE FOR STARTING AN INTERNAL COMBUSTION ENGINE HAVING DIRECT INJECTION

CROSS-REFERENCE TO RELATED APPLICATIONS

The present application claims priority to Application No. 102 58 229.7, filed in the Federal Republic of Germany on Dec. 13, 2002, which is expressly incorporated herein in its entirety by reference thereto.

FIELD OF THE INVENTION

The present invention is directed to a method for starting an internal combustion engine. More particularly, the present invention relates to an internal combustion engine, a control device for controlling and/or regulating the aforementioned internal combustion engine, and a computer program that is able to run on a computing device, e.g., on a microprocessor.

BACKGROUND INFORMATION

In conventional direct-start methods, a fuel quantity that may be required for combustion may be injected into the combustion chamber of a cylinder whose piston may be in a working position, the injection taking place when the internal combustion engine is at standstill. The air-fuel mixture contained in the combustion chamber may be ignited within approximately 100 ms. The ignition of this air-fuel mixture represents the beginning of the so-called start phase, this, start phase being completed when idling speed is attained. The combustion of the air-fuel mixture at the beginning of the start phase may need to release sufficient energy to generate a torque at the crankshaft and to set it in motion in such a manner that in an internal combustion engine having a plurality of cylinders, for example, a piston of another cylinder is brought into working position. The energy generated during the combustion of an air-fuel mixture, made up of the air mass enclosed in the cylinder and the fuel quantity injected into it, is a function of the composition of the air-fuel mixture. Therefore, the carburetion may be of great importance, especially in a direct-start method without electromotive starter.

A warm start is made even more difficult in that, due to the air losing density with rising temperature, the charge of the cylinder is lower, which results in a reduced combustion torque.

SUMMARY

The present invention may provide a method that allows the mixture formation to be improved during a start of an internal combustion engine, e.g., during a warm start.

A fuel quantity required in the combustion chamber for a first mixture formation prior to the beginning of a start phase of the internal combustion engine may be introduced into the combustion chamber by a plurality of successive injections of fuel.

An example embodiment of the present invention is directed to a method for starting an internal combustion engine having:

at least one cylinder and a piston guided therein in a moveable manner;

a combustion chamber formed in the cylinder;

a device for direct injection by which the fuel is able to be introduced directly into the combustion chamber; and a control device for controlling and/or regulating the internal combustion engine, in particular for controlling and/or regulating the device for direct injection.

Fuel has a tendency to vaporize because of so-called volatility. The vaporization tendency is increased by an enlargement of an area formed by the fuel. For these reasons, the vaporization tendency of fuel that is injected into a combustion chamber may be relatively high. Due to the vaporization of the injected fuel, the mixture formation is in turn improved insofar as the mixture is easier to ignite. However, this requires that sufficient time for vaporization to take place and/or that the injected fuel mass is small enough to vaporize during a predefined period of time. Vaporization is substantially increased if the fuel mass required in a combustion chamber during a start phase for a first ignition is introduced into the combustion chamber by a plurality of successive injections and only a small fuel quantity is injected into the combustion chamber in each case. This results in a better mixture formation compared to a single injection of the same quantity of fuel into the combustion chamber.

In a further exemplary development of the method, a first injection of the fuel mass required for the first mixture formation is introduced into the combustion chamber at least 100 ms prior to the beginning of the start phase of the internal combustion engine. In particular, the timing of the fuel injections into the combustion chamber prior to the beginning of the start phase is selected in such a manner that the carburetion via the fuel vaporization is improved by selective utilization of the thermal energy stored in a cylinder wall and the piston. Often, for example, an internal combustion engine is switched off only briefly and then started up again during a so-called warm-start procedure. In what is known as a start-stop function, the internal combustion engine of a motor vehicle is switched off while the vehicle is stopped at a traffic light. Activating the accelerator or shifting into gear brings about a start of the internal combustion engine, which still has roughly operating temperature at this point. If, for example, fuel is injected into the combustion chamber in a first injection immediately upon reaching a standstill, while a start-stop function is executed, the thermal energy stored in the cylinder walls and given off into the combustion chamber causes increased fuel vaporization, which in turn results in more homogenous carburetion.

A fuel mass required for combustion in the combustion chamber during the start phase of the internal combustion engine may be introduced into the combustion chamber via a plurality of successive injections. This may result in better combustion of the fuel mass during the start phase as well and thus may reduce emissions.

In an exemplary embodiment, to improve the mixture formation, air turbulence may be generated in the combustion chamber by controlling the number of injections, the injection timing, the time intervals between the injections, and/or the injection duration. This air turbulence may be generated in a selective manner and maintained for a specific period of time by the individual injections so as to improve the carburetion by increased fuel vaporization and reduced fuel deposits in the boundary regions of the combustion chamber.

An example embodiment of the present invention may also include an internal combustion engine of the type mentioned in the introduction. The control device in this internal combustion engine may induce the device for direct injection to introduce into the combustion chamber a fuel mass required in the combustion chamber for a first mixture formation prior to the beginning of a start phase of the internal combustion engine, using a plurality of successive injections of fuel.

The control device may induce the device (or arrangement) for direct injection to introduce into the combustion chamber a fuel mass required in the combustion chamber for mixture formation during the start phase of the internal combustion engine, via a plurality of successive injections of fuel.

The control device may induce the device for direct injection to introduce into the combustion chamber a first injection of the fuel mass required for the first mixture formation at least 100 ms before the beginning of the start phase of the internal combustion engine.

In an exemplary embodiment of the internal combustion engine, the control device triggers the injection system in such a manner that air turbulence is generated in the combustion chamber via the injections, for the purpose of improving the first mixture formation.

Furthermore, an exemplary embodiment of the present invention may include a control device for controlling and/or regulating an internal combustion engine of the type described above, in particular for controlling and/or regulating a device for direct injection of the internal combustion engine. The control device induces the device for direct injection to introduce into the combustion chamber a fuel mass required in the combustion chamber for a first mixture formation prior to the beginning of a start phase of the internal combustion engine, using a plurality of successive injections of fuel.

In an exemplary further development of the control device, the control device may induce the device for direct injection to inject into the combustion chamber a first injection of the fuel mass required for the first mixture formation at least 100 ms before the beginning of the start phase of the internal combustion engine.

In an exemplary manner, the control device may induce the device for direct injection to introduce into the combustion chamber a fuel mass required in the combustion chamber for a mixture formation during a start phase of the internal combustion engine, using a plurality of successive injections of fuel.

In an exemplary embodiment, the control device may generate air turbulence in the combustion chamber in order to improve the mixture formation, by controlling the number of injections, the injection timing, the time intervals between the injections and/or the injection duration.

An exemplary embodiment of the present invention may be realized in the form of a computer program. The computer program may be executed in a computing device, in particular in a microprocessor of a control device, and is suited to implement an exemplary method according to the present invention. In this situation, the computer program may realize an exemplary embodiment of the present invention. The exemplary computer program may represent an exemplary embodiment of the present invention in the same manner as the exemplary method for whose execution the computer program is suited. The computer program may be stored on a memory element. In particular, a random-access memory, a read-only-memory, a flash memory, etc. may be used as memory element.

DETAILED DESCRIPTION

Figure 1:
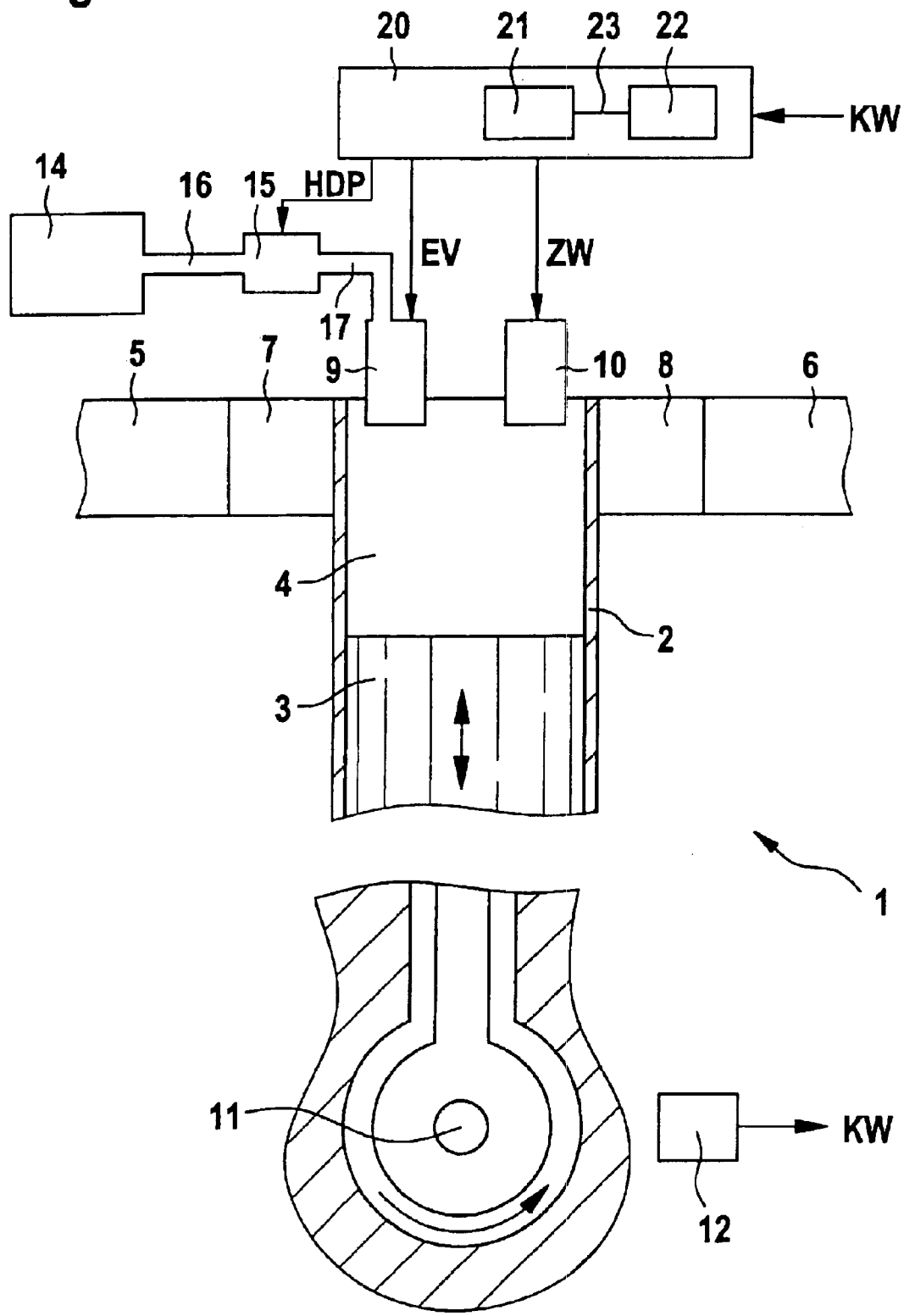
FIG. 1 illustrates a schematic representation of an internal combustion engine having direct injection.

FIG. 1 shows an internal combustion engine 1 having a device for direct injection. This internal combustion engine 1 includes a cylinder 2 in which a piston 3 is guided in a moveable manner. The internal combustion engine may also have a plurality of cylinders. Formed in cylinder 2 is a combustion chamber 4. Discharging into this combustion chamber 4 are an intake channel 5, via an intake valve 7, and a discharge channel 6, via a discharge valve 8. Furthermore, a spark plug 10, able to be triggered via a signal ZW, and a fuel injector 9, able to be triggered via a signal EV, are assigned to combustion chamber 4. By a fuel line 16, a fuel storage tank 14 is connected to a high-pressure pump 15, which may be triggered via a signal HDP. Connected thereto, via high-pressure line 17, is fuel injector 9.

The back-and-forth movement of piston 3 in the cylinder is converted into a rotary motion of a crankshaft 11. An absolute inclination sensor 12 generates a signal KW as a function of a position of crankshaft 11. Furthermore, FIG. 1 shows a control device 20, which includes a microprocessor 21 and a memory element 22 connected via a bus system 23. Control device 20 controls and/or regulates the fuel-injection system. All signals mentioned so far are transmitted to control device 20 or are generated by control device 20.

During operation of the internal combustion engine pressure is built up in fuel high-pressure line 17 via high-pressure pump 15, so that, when fuel injector 9 is open, a certain fuel mass may be supplied to combustion chamber 4 within a specific period of time. In a warm start, the pressure required for this purpose and generated by high-pressure pump 15 is still available in fuel high-pressure line 17 or, in an example embodiment, is provided by suitable device(s) specifically for this purpose.

To implement a warm start of internal combustion engine 1 without electromotive starter, control device 20 then triggers fuel injector 9 by a signal EV in such a manner that a previously determined fuel quantity enters combustion chamber 4 during a predefined time period via a first injection. This may take place, for example, while a start-stop function is executed, directly after the internal combustion engine has been switched off (stopped). Utilizing the thermal energy stored in the walls of cylinder 2 and in piston 5 and likewise utilizing the relatively long dwell time of the fuel in combustion chamber 4, the injected fuel vaporizes, thus allowing a homogenous air-fuel mixture to form in combustion chamber 4. At certain time intervals, but still prior to ignition of the mixture, this first injection is followed by additional injections into the combustion chamber of the same cylinder, so that so-called spray-induced air turbulence is initiated and maintained in an effective manner. In the process, a homogenous mixture having a high fuel-vapor component is generated in combustion chamber 4. The injections following the first injections may be equidistant, i.e., they may occur at uniform time intervals. However, it is also possible that the individual injections are implemented at different time intervals, so as to increase the spray-induced air turbulence, for example. It is also possible that the fuel mass introduced into the combustion chamber with each injection has a different size, regardless of the size of the fuel mass required for a first ignition, in this manner optimizing the vaporization of the introduced fuel, for example. At a predefined instant, via a signal ZW, spark plug 10 generates an ignition spark, which ignites the air-fuel mixture and thereby starts internal combustion engine 1.

Figure 2:
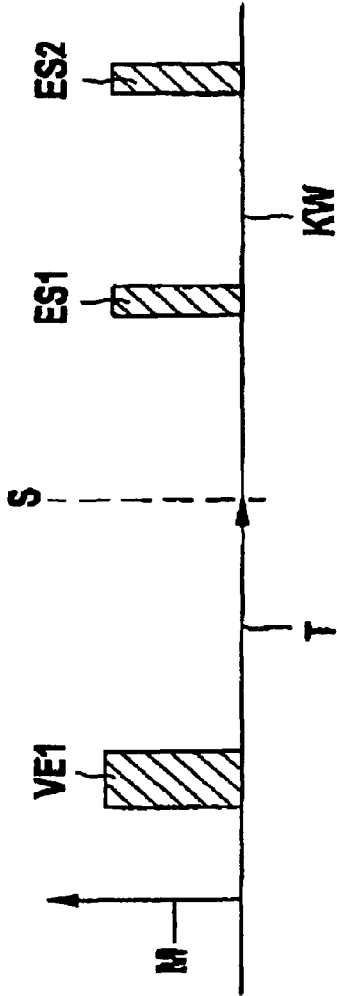
FIG. 2 illustrates a possible injection pattern with a pre-injection.

FIG. 2 shows an injection pattern in which the injections are denoted by VE1, ES1 and ES2. In this injection pattern, the single pre-injection, VE1, is implemented prior to the beginning of start phase S. Horizontal axis T denotes the characteristic of a time unit, and vertical axis M the size of an injected fuel mass. With the beginning of start phase S, the horizontal axis is denoted by KW. The two different designations, T, KW, for the horizontal axis indicate that pre-injection VE1 is time-triggered, while injections ES1, ES2 are triggered during operation of internal combustion engine 1 and thus are controlled as a function of a detected crankshaft angle, in particular during start phase S.

In FIG. 2, only a single pre-injection, VE1, is carried out, for example while implementing a start-stop function immediately after internal combustion engine 1 has come to a standstill. Until start phase S sets in, the thermal energy stored in the cylinder wall causes the injected fuel to vaporize and a homogenous fuel mixture to form as a result.

Figure 3:
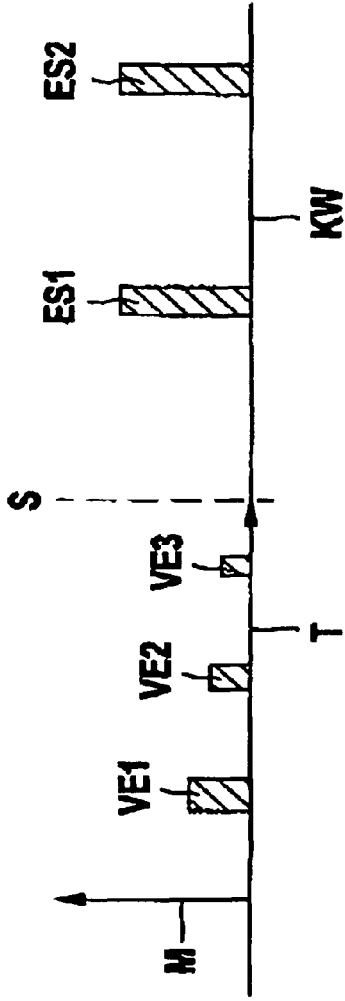
FIG. 3 illustrates an additional possible injection pattern having a plurality of pre-injections.

FIG. 3 shows an additional injection pattern, using the same designations as in FIG. 2. In particular, VE1 again denotes a first pre-injection. However, in FIG. 3 a smaller fuel mass is injected than in the injection pattern shown in FIG. 2. The fuel mass still required for implementing a direct start during start phase S is introduced into combustion chamber 4 by two additional pre-injections, VE2 and VE3. Dividing a pre-injection into a plurality of smaller injection quantities may increase the fuel vaporization. Furthermore, by such repeat injections the generation of air turbulence is controlled and maintained in an effective manner, so that additional support is provided in the production of a homogenous air-fuel mixture. As a result, a homogenous air-fuel mixture is available for an ignition beginning during start phase S, this mixture allowing an optimized combustion and thus increased combustion torque.

Figure 4:
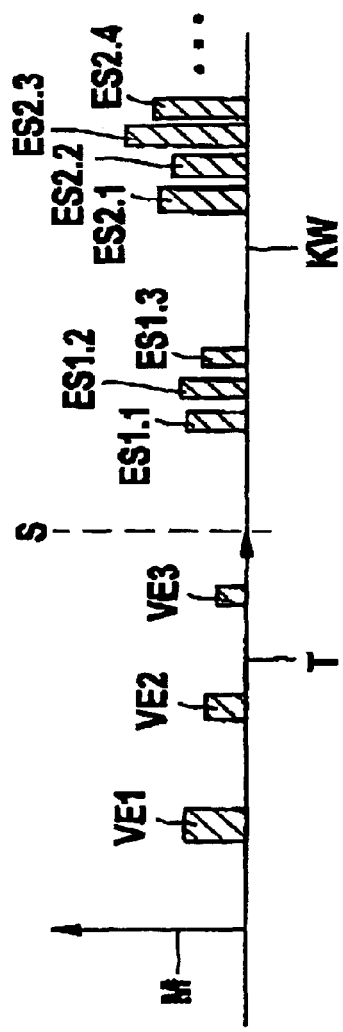
FIG. 4 illustrates a possible injection pattern having a plurality of pre-injections and a plurality of injection quantities during the start phase.

In addition to the injections required for a first mixture formation prior to a start phase, the injection pattern shown in FIG. 4 includes a plurality of injections for generating required fuel masses during the start phase. A fuel mass required for a first combustion during the start phase is represented by injections ES1.1, ES1.2, ES1.3, and a fuel mass required for a second combustion during the start phase is denoted by injections ES2.1, ES2.2, ES2.3 and ES2.4.

Using this injection pattern, air turbulence and thus an improved mixture formation are achieved for the mixture formations during a start phase as well, which results in improved emission behavior during the start phase. The intervals of the injections required for mixture formation during the start phase may be time-triggered, or may also be triggered as a function of a detected crankshaft angle.

What is claimed is:

1. A method for starting an internal combustion engine, the internal combustion engine having at least one cylinder, a piston moveably guided in the cylinder, a combustion chamber formed in the cylinder, a direct injection device adapted to introduce fuel directly into the combustion chamber, and a control device adapted to at least one of control and regulate the internal combustion engine, comprising:

introducing into the combustion chamber, by a plurality of successive injections of the fuel, a fuel mass required in the combustion chamber for a first mixture formation prior to a beginning of a start phase of the internal combustion engine.

2. The method of claim 1, wherein the introducing step includes the substep of introducing a first injection of the fuel mass required for the first mixture formation into the combustion chamber at least 100 ms prior to the beginning of the start phase of the internal combustion engine.

3. The method of claim 1, further comprising introducing into the combustion chamber by a plurality of successive injections a fuel mass required for a combustion in the combustion chamber during the start phase of the internal combustion engine.

4. The method of claim 1, further comprising selectively generating air turbulence to improve mixture formation by controlling at least one of a number of injections, an injection timing, time intervals between injections, and an injection duration.

5. An internal combustion engine, comprising:
at least one cylinder;
a piston moveably guided in the cylinder;
a combustion chamber formed in the cylinder;
a direct injection device adapted to introduce fuel directly into the combustion chamber; and
a control device adapted to at least one of control and regulate the internal combustion engine, the control device configured to induce the direct injection device to introduce into the combustion chamber, by a plurality of successive injections of the fuel, a fuel mass required in the combustion chamber for a first mixture formation prior to a beginning of a start phase of the internal combustion engine.

6. The internal combustion engine of claim 5, wherein the control device is configured to induce the direct injection device to introduce into the combustion chamber a first injection of the fuel mass required for the first mixture formation at least 100 ms prior to the beginning of the start phase of the internal combustion engine.

7. The internal combustion engine of claim 5, wherein the control device is configured to induce the direct injection device to introduce into the combustion chamber, by a plurality of successive injections of the fuel, a fuel mass required in the combustion chamber for mixture formation during the start phase of the internal combustion engine.

8. The internal combustion engine of claim 5, wherein the control device is configured to control the direct injection device to generate an air turbulence in the combustion chamber by the injections to improve mixture formation.

9. An arrangement, comprising:
a control device adapted to at least one of control and regulate an internal combustion engine, the control device configured to induce a direct injection device to introduce into a combustion chamber, by a plurality of successive injections of fuel, a fuel mass required in the combustion chamber for a first mixture formation prior to a beginning of a start phase of the internal combustion engine.

10. The arrangement of claim 9, wherein the control device is configured to induce the direct injection device to introduce into the combustion chamber a first injection of the fuel mass required for the first mixture formation at least 100 ms prior to the beginning of the start phase of the internal combustion engine.

11. The arrangement of claim 9, wherein the control device is configured to induce the direct injection device to introduce into the combustion chamber, by a plurality of successive injections of the fuel, a fuel mass required in the combustion chamber for a mixture formation during a start phase of the internal combustion engine.

12. The arrangement of claim 9, wherein the control device is configured to generate an air turbulence in the combustion chamber to improve a mixture formation by controlling at least one of a number of injections, an injection timing, time intervals between the injections, and an injection duration.

13. A computer program adapted to be executed on a computing unit, the computer program comprising a method including:

introducing into the combustion chamber, by a plurality of successive injections of fuel, a fuel mass required in a combustion chamber for a first mixture formation prior to a beginning of a start phase of an internal combustion engine, the internal combustion engine including at least one cylinder, a piston moveably guided in the cylinder, the combustion chamber formed in the at least one cylinder, a direct injection device adapted to introduce the fuel directly into the combustion chamber, and a control device adapted to at least one of control and regulate the internal combustion engine.

14. The computer program of claim 13, wherein the computer program is stored on a memory element.

15. The method of claim 1, wherein the control device is adapted to at least one of control and regulate the device for direct injection.

16. The internal combustion engine of claim 5, wherein the control device is adapted to at least one of control and regulate the device for direct injection.

17. The arrangement of claim 9, wherein the control device is adapted to at least one of control and regulate the arrangement for direct injection of the internal combustion engine.

18. The computer program of claim 13, wherein the computer program is adapted to run on a microprocessor of a control device, the control device adapted to at least one of control and regulate an internal combustion engine.

19. The computer program of claim 13, wherein the computer program is stored on one of a random-access memory, a read-only memory, and a flash memory.

* * * * *